United States Patent
Moon et al.

(10) Patent No.: US 12,446,477 B1
(45) Date of Patent: Oct. 14, 2025

(54) RECONFIGURABLE DEVICES WITH MULTI-LAYER COMPOSITE PHASE CHANGE MATERIALS

(71) Applicant: HRL Laboratories, LLC, Malibu, CA (US)

(72) Inventors: Jeong-Sun Moon, Moorpark, CA (US); Hwa Chang Seo, Malibu, CA (US); Kyung-Ah Son, Moorpark, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 586 days.

(21) Appl. No.: 17/858,948

(22) Filed: Jul. 6, 2022

Related U.S. Application Data

(60) Provisional application No. 63/241,465, filed on Sep. 7, 2021.

(51) Int. Cl.
| | |
|---|---|
| H10N 70/20 | (2023.01) |
| G11C 13/00 | (2006.01) |
| H10N 70/00 | (2023.01) |

(52) U.S. Cl.
CPC ....... H10N 70/231 (2023.02); G11C 13/0004 (2013.01); H10N 70/026 (2023.02); H10N 70/041 (2023.02); H10N 70/8613 (2023.02); H10N 70/8828 (2023.02)

(58) Field of Classification Search
CPC .. H10N 70/231; H10N 70/026; H10N 70/041; H10N 70/8613; H10N 70/8828; G11C 13/0004
See application file for complete search history.

(56) References Cited

U.S. PATENT DOCUMENTS

| | | | |
|---|---|---|---|
| 7,728,319 B2 | 6/2010 | Goux | |
| 8,900,930 B2 | 12/2014 | Moon | |
| 9,293,699 B1 | 3/2016 | Moon | |
| 9,362,379 B2 | 6/2016 | Moon | |
| 9,368,720 B1 | 6/2016 | Moon et al. | |
| 9,972,905 B2 | 5/2018 | Schaffner et al. | |
| 10,937,960 B2 * | 3/2021 | Slovin | H10N 70/8825 |
| 11,187,891 B1 | 11/2021 | Moon et al. | |

(Continued)

OTHER PUBLICATIONS

Botula, A., et al., "A Thin-film SOI 180 nm CMOS RF Switch Technology", Silicon Monolithic Integrated Circuits in RF Systems (SIRF), pp. 1-4, Jan. 2009.

(Continued)

*Primary Examiner* — David Vu
(74) *Attorney, Agent, or Firm* — Ladas & Parry, LLP

(57) ABSTRACT

A device having: a multilayer composite phase change material structure with: a bottom PCM layer of a first SbTe PCM material having a first metallic doping; a first composite PCM layer on the bottom PCM layer, wherein the first composite PCM layer comprises at least: a first composite layer, comprising said first PCM material having a second metallic doping; and a second composite layer, comprising said first SbTe PCM material undoped, on the first composite layer; and a top PCM layer, comprising first SbTe PCM material having said first metallic doping, on the composite PCM layer. The first metallic doping can be identical to the second metallic doping. The first PCM material can comprise SbTe and the first and second metallic dopings can comprise one of Ge, In and GeIn.

15 Claims, 12 Drawing Sheets

(56) References Cited

U.S. PATENT DOCUMENTS

| | | |
|---|---|---|
| 11,314,109 B1 | 4/2022 | Moon et al. |
| 2006/0082427 A1 | 4/2006 | Joung |
| 2010/0096255 A1 | 4/2010 | Ye |
| 2013/0181182 A1 | 7/2013 | Perniola |
| 2014/0264230 A1 | 9/2014 | Borodulin |

OTHER PUBLICATIONS

Chua et al., "Low resistance, high dynamic range reconfigurable phase change switch for RF applications", Applied Physics Letters, vol. 97, 183506-1 to 83506-3, 2010.
EE Times, Nov. 2011, "Samsung preps 8-Gbit phase-change memory", pp. 1-6.
Kelly, D. et al., "The State-of-the-art of Silicon-on-Sapphire CMOS RF switches", CSICS Digest, pp. 200-203, 2005.
Lankhorst, et al., "Low-cost and nanoscale non-volatile memory concept for future silicon chips," Nature Materials, vol. 4, Apr. 2005, pp. 347-352.
Lo, et al., "Three-terminal probe reconfigurable phase-change material switches", IEEE Transactions on Electron Devices., vol. 57, No. 1, pp. 312-320, Jan. 2010.
Makioka, S. et al., "Super self-aligned GaAs RF switch IC with 0.25 dB extremely low insertion loss for mobile communications", IEEE Transactions Electron Devices, vol. 48, No. 8, pp. 1510-1514, Aug. 2001.
Moon, J. S. et al., "11 THz figure-of-merit phase-change RF switches for reconfigurable wireless front-ends", IEEE MTT-S International Microwave Symposium, pp. 1-4, 2015.
Moon, J.S et al., "High-linearity 1 ohm RF switches with phase-change materials", SIRF, pp. 7-9, Jan. 2014.
Oomachi, et al. "Recording Characteristics of Ge Doped Eutectic SbTe Phase Change Discs with Various Compositions and Its Potential for High Density Recording," Japanese Journal of Applied Physics, vol. 41, No. 3, Mar. 2002, pp. 1695-1697.
Perniola et al, "Electrical behavior of phase change memory cells based on GeTe", IEEE EDL., vol. 31, No. 5, pp. 488-490, May 2010.
Rebeiz, G. et al., "Tuning in to RF MEMS" IEEE Microwave Magazine, pp. 55-72, Oct. 2009.
Tomback, A. et al., "Cellular Antenna Switches for Multimode Applications based on a Silicon-on-Insulator Technology", Radio Frequency Integrated Circuits Symposium (RFIC), pp. 271-274, May 2010.
Wen et al., "A phase-change via-reconfigurable on-chip inductor", IEDM Tech digest, pp. 10.3.1-10.3.4, Dec. 2010.
Zhu, M., et al. "One order of magnitude faster phase change at reduced power in Ti—Sb—Te", Nature Communications, Published online Jul. 8, 2014. doi:10.1038/ncomms5086; PMCID: PMC4102114 (6 pages).

From U.S. Appl. No. 14/528,945 (now U.S. Pat. No. 9,368,720), Notice of Allowance dated Feb. 16, 2016.
From U.S. Appl. No. 14/528,945 (now U.S. Pat. No. 9,368,720), Office Action dated Oct. 16, 2015.
From U.S. Appl. No. 15/444,101 (unpublished, non-publication request filed), Decision dated Oct. 24, 2021.
From U.S. Appl. No. 15/444,101 (unpublished, non-publication request filed), Office action dated Mar. 11, 2019.
From U.S. Appl. No. 15/444,101 (unpublished, non-publication request filed), Office action dated Jan. 3, 2019.
From U.S. Appl. No. 15/444,101 (unpublished, non-publication request filed), Office action dated Aug. 9, 2018.
From U.S. Appl. No. 15/444,101 (unpublished, non-publication request filed), Office action dated Jun. 7, 2018.
From U.S. Appl. No. 15/444,101 (unpublished, non-publication request filed), Office action dated Mar. 27, 2019.
From U.S. Appl. No. 15/444,101 (unpublished, non-publication request filed), Office action dated Oct. 6, 2017.
J. S. Moon, H. Seo, K. Son, K. Lee, D. Zehnder, H. Tai, and D. Le, "5 THz Figure-of-Merit Reliable Phase-change RF Switches for Millimeter-wave Applications", *IEEE MTT-S International Microwave Symposium*, Jun. 2018. DOI: 10.1109/MWSYM.2018.8439479, entire document.
P. Borodulin et al., "Recent Advances in Fabrication and Characterization of GeTe-based phase-change RF switches and MMICs", IEEE MTT-S 2017 International Microwave Symposium Digest, 2017, entire document.
El-Hinnawy et al., "Four-terminal inline Chalcogenide phase-change RF switch using an independent resistive heater for thermal actuation", IEEE EDL, vol. 34, (2013), entire document.
Y-H Shim and M. Rais-Zadel, "Non-linear analysis of RF ohmic switches based on phase—change materials", IEEE EDL, vol. 35, (2014), entire document.
J. S. Moon, H. C. Seo, and D. Le, "Development toward high-power sub-1 ohm DC-67 GHz RF switches using phase change materials for reconfigurable RF front-end", *IEEE MTT-S International Microwave Symposium*, 2014. 10.1109/MWSYM.2014.6848334, entire document.
J. S. Moon et al., "Reconfigurable Infrared spectral imaging with robust phase change materials", SPIE Proceedings, 2019, entire document.
J. S. Moon et al., "Electrically-programmable optical devices with phase change materials", SPIE Proceedings, 2020, entire document.
U.S. Appl. No. 15/444,101, filed Feb. 27, 2017.
El-Hinnawy et al., "A 25 THz $F_{CO}$ (6.3 fs $R_{ON}C_{OFF}$) Phase-Change Material RF Switch Fabricated in a High Volume Manufacturing Environment with Demonstrated Cycling > 1 Billion Times", 2020 IEEE / MTT-S International Microwave Symposium Digest, 2020, entire document.

\* cited by examiner

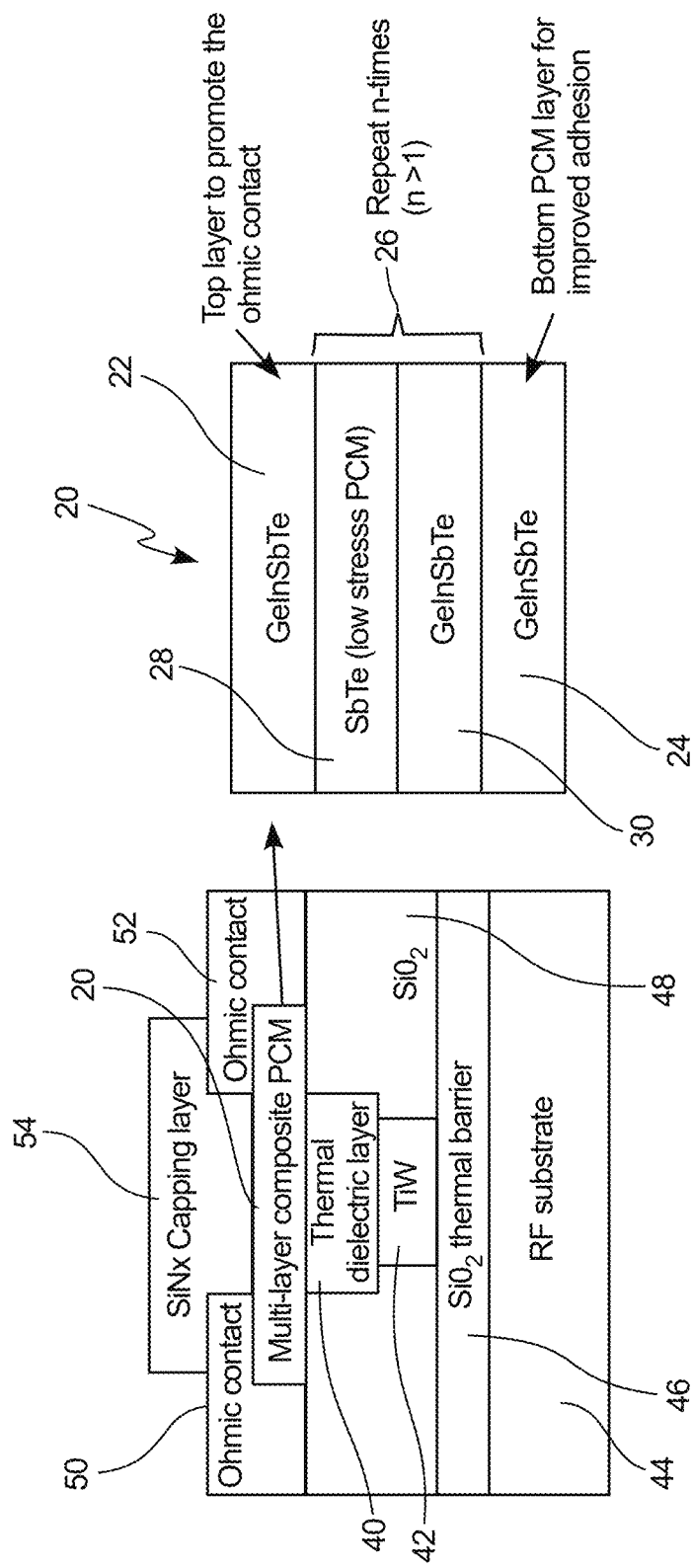

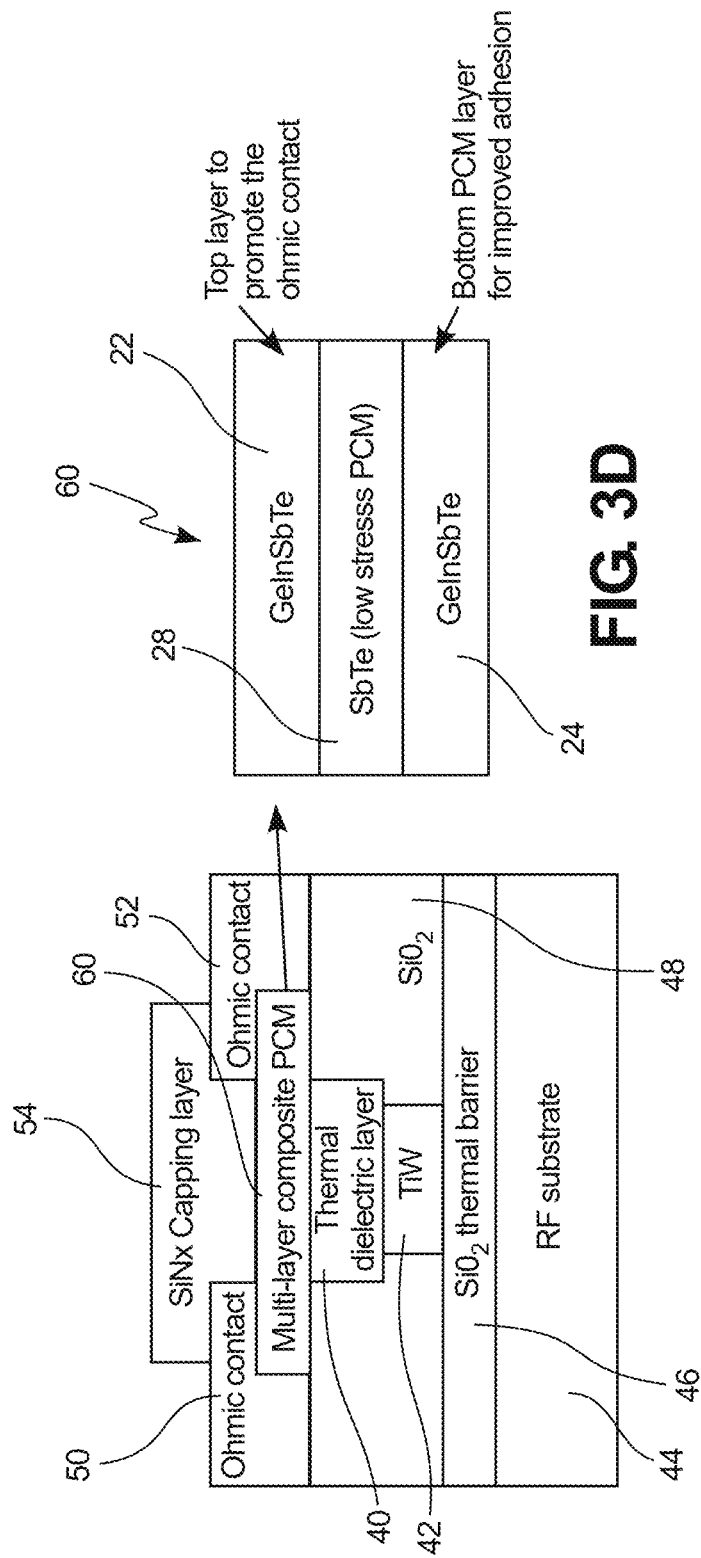

RECONFIGURABLE DEVICES WITH MULTI-LAYER COMPOSITE PHASE CHANGE MATERIALS

CROSS REFERENCE TO RELATED APPLICATIONS

This application is related to and claims the benefit of U.S. Provisional Patent Application No. 63/241,465, filed Sep. 7, 2021, and titled "Reconfigurable Devices with Multi-Layer Composite Phase Change Materials", which is hereby incorporated herein by reference.

This application is also related to U.S. Pat. No. 9,368,720, issued Jun. 14, 2016, and titled "A Method to Make Phase-Change Material RF Switches with Thermal Dielectrics", which is hereby incorporated herein by reference.

This application is also related to U.S. patent application Ser. No. 15/444,101, filed Feb. 27, 2017 and titled "Planar RF Switches with Phase-Change SBTE Alloys", which is hereby incorporated herein by reference.

STATEMENT REGARDING FEDERAL FUNDING

This invention was made with Government support. The U.S. Government may have certain rights in this invention.

TECHNICAL FIELD

This disclosure relates to radio frequency and millimeter-wave devices and switches with phase change materials.

BACKGROUND

Phase change materials (PCMs) were commercialized for non-volatile memory by Intel in 2017 and optical memory and DVDs early on. A PCM memory uses a single-layer GeSbTe alloy defined in nano-scale dimensions. Different PCMs such as GeTe and SbTe alloys are now being evaluated as RF switches, as described in References [2] to [4], below, which are incorporated herein by reference, and spatial light modulators, as described in References [5] to [6], below, which are incorporated herein by reference. Traditionally, PCM-based devices are based on the resistance change between their amorphous (high-resistance) and crystalline (low-resistance) phases. The phase-change may be triggered by an electrical pulse applied to an embedded micro-heater, which induces a rapid melt-and-quench cycle for amorphization for a high resistance state (RESET process). A major bottleneck in developing this PCM technology toward non-memory applications has been the switching reliability of large-area PCM devices required for the non-memory applications since the rapid melt-and-quench cycles induce a volume change and mechanical stress in the large-area PCM devices. Moon et al. in Reference [1], which is incorporated herein by reference, reported a robust switching cycle endurance of the GeInSbTe RF PCM switches approaching 10 million for the first time in 2018. Borodulin et al. in Reference [2], which is incorporated herein by reference, reported 30k switching cycles with GeTe PCM switches. In 2020, El-Hinnawy et al. in Reference [3], which is incorporated herein by reference, reported 10 million to 1 billion switching cycles depending on the size of the PCM switches; however, the material is not disclosed.

The dominant failure mechanism with PCM switches is with the mechanical stress build-up over the repetitive switching cycles associated with the mechanical volume change. FIGS. 1A and 1B show the mechanical volume change associated with the phase change of different PCMs. A SbTe PCM has a smaller volume change of about 1% compared to a GeSbTe memory PCM that has about a 5-6% volume change. However, a SbTe alloy is not fabrication friendly due to poor adhesion properties.

FIGS. 2A, 2B and 2C show example prior art PCM-based RF devices, showing both non-planar and planar configurations, each having a single-layer PCM layer 10. All of the prior art PCM devices utilize a single-layer bulk PCM 10 as an active reconfigurable material, as described in References [1] to [6] below for RF devices, and References [7] to [8] for optical applications, which are incorporated herein by reference.

While the switching cycle endurance problems of the PCM devices have been known, it has not been obvious how to mitigate the mechanical stress build-up problem, and most of the existing PCM applications are for the memory in nano-scale dimensions, where the mechanical stress is less.

REFERENCES

The following documents are incorporated herein by reference.

[1] J. S. Moon, H. Seo, K. Son, K. Lee, D. Zehnder, H. Tai, and D. Le, "5 THz Figure-of-Merit Reliable Phase-change RF Switches for Millimeter-wave Applications", IEEE MTT-S *International Microwave Symposium, June* 2018. DOI: 10.1109/MWSYM.2018.8439479.

[2] P. Borodulin et al., "Recent Advances in Fabrication and Characterization of GeTe-based phase-change RF switches and MMICs", IEEE MTT-S 2017 International Microwave Symposium Digest, 2017.

[3] El-Hinnawy et al., "A 25 THz Fco (6.3 fs $R_{ON}C_{OFF}$) Phase-Change Material RF Switch Fabricated in a High Volume Manufacturing Environment with Demonstrated Cycling >1 Billion Times", 2020 IEEE/MTT-S International Microwave Symposium Digest, 2020.

[4] El-Hinnawy et al., "Four-terminal inline Chalcogenide phase-change RF switch using an independent resistive heater for thermal actuation", IEEE EDL, vol. 34, p. 1313, (2013):

[5] Y-H Shim and M. Rais-Zadel, "Non-linear analysis of RF ohmic switches based on phase-change materials", IEEE EDL, vol. 35, p. 405, (2014)

[6] J. S. Moon, H. C. Seo, and D. Le, "Development toward high-power sub-1 ohm DC-67 GHz RF switches using phase change materials for reconfigurable RF front-end", *IEEE MTT-S International Microwave Symposium,* 2014. 10.1109/MWSYM.2014.6848334.

[7] J. S. Moon et al., "Reconfigurable Infrared spectral imaging with robust phase change materials", SPIE Proceedings, 2019.

[8] J. S. Moon et al., "Electrically-programmable optical devices with phase change materials", SPIE Proceedings, 2020.

What is needed are devices and methods that improve the switching cycle endurance of devices utilizing PCM. In particular, devices and methods are needed to mitigate the mechanical stress causes by switching the state of the PCM. The embodiments of the present disclosure answer these and other needs.

SUMMARY

In a first embodiment disclosed herein, a device comprises a multilayer composite phase change material structure comprising a bottom PCM layer of a first SbTe PCM material having a first metallic doping; a first composite PCM layer on the bottom PCM layer, wherein the first composite PCM layer comprises at least: a first composite layer, comprising said first PCM material having a second metallic doping; and a second composite layer, comprising said first SbTe PCM material undoped, on the first composite layer; and a top PCM layer, comprising first PCM material having said first metallic doping, on the composite PCM layer. According to an embodiment disclosed herein, the first metallic doping is identical to the second metallic doping.

According to an embodiment disclosed herein, the first undoped PCM material comprises SbTe and the first and second metallic dopings comprise one of Ge, In and GeIn. The doping concentration (in mass) can be larger then 0% and smaller than or equal to 5%.

In another embodiment disclosed herein, a device comprises a composite phase change material structure comprising a composite phase change material structure with: a bottom layer of a first SbTe PCM material having a first metallic doping; an intermediate layer, of said first SbTe PCM material undoped, on the bottom layer; and a top layer of said first SbTe PCM material having said first metallic doping, on the intermediate layer. According to an embodiment disclosed herein, said first PCM material comprises SbTe and said first and metallic doping comprises one of Ge, In, and GeIn.

In yet another embodiment disclosed herein, a method of providing a phase change material (PCM) device comprises forming a bottom SbTe PCM layer by sputtering a first PCM material having a first metallic doping in an amorphous phase; forming a composite phase change material layer on the bottom PCM layer, wherein the first composite phase change material layer comprises at least: a first composite layer, formed by sputtering said first PCM material having a second metallic doping in an amorphous phase; and a second composite layer, formed by sputtering said first SbTe PCM material, undoped, in an amorphous phase on the first composite layer; and forming a top PCM layer on the composite PCM layer by sputtering said first PCM material having said first metallic doping in an amorphous phase. According to an embodiment disclosed herein, said first metallic doping is identical to said second metallic doping.

According to an embodiment disclosed herein, said first PCM material comprises SbTe and said first and second metallic dopings comprise each one of Ge, In, and GeIn.

In still another embodiment disclosed herein, a method of providing a phase change material (PCM) device comprises forming a composite phase change material layer comprising: a bottom SbTe PCM layer of a first PCM material having a first metallic doping, formed by sputtering in an amorphous phase; an intermediary layer, of said first SbTe PCM material undoped, formed on the bottom PCM layer by sputtering in an amorphous phase; and a top PCM layer of said first PCM material having said first metallic doping, formed on the intermediary layer by sputtering in an amorphous phase. According to embodiments disclosed herein, said first PCM material comprises SbTe and wherein said first metallic doping comprises one of Ge, In, and GeIn.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 3A, 3B, 3C and 3D show PCM device structures with multi-layer composite phase-change material in accordance with the present disclosure.

DETAILED DESCRIPTION

Figure 1A:
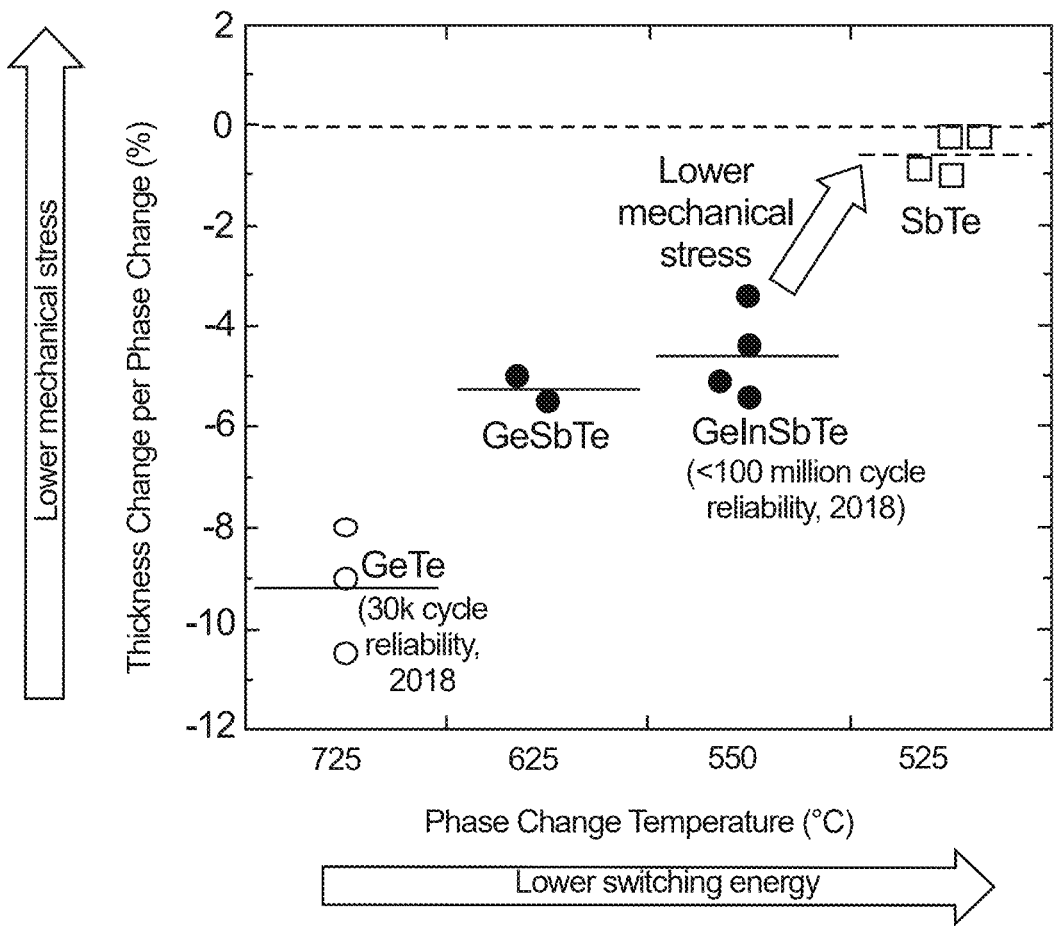
FIGS. 1A and 1B show volume changes of various PCMs during a phase change, showing that a SbTe alloy has a smaller volume change than other PCMs.
Figure 1B:
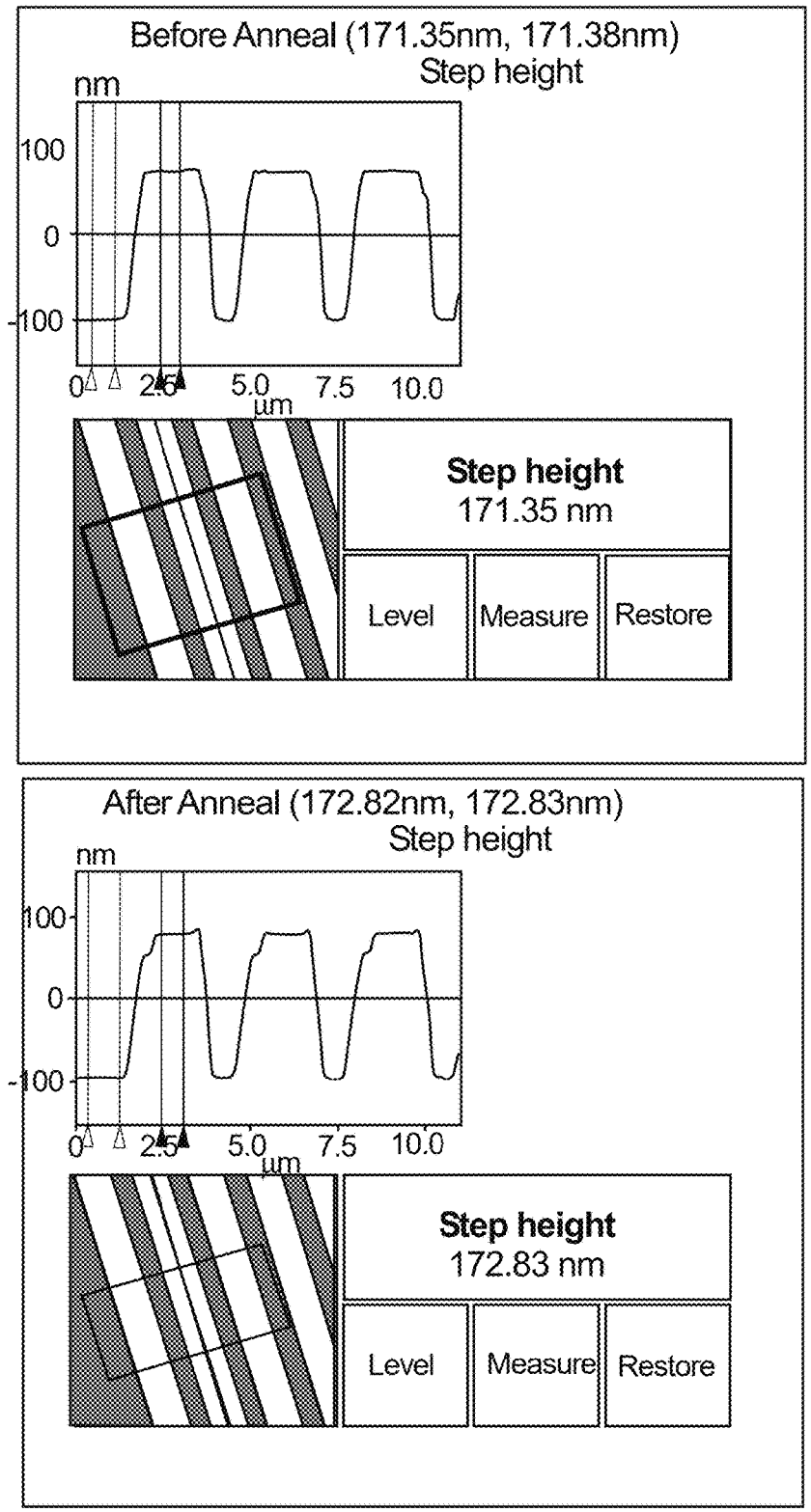
Figure 2A:
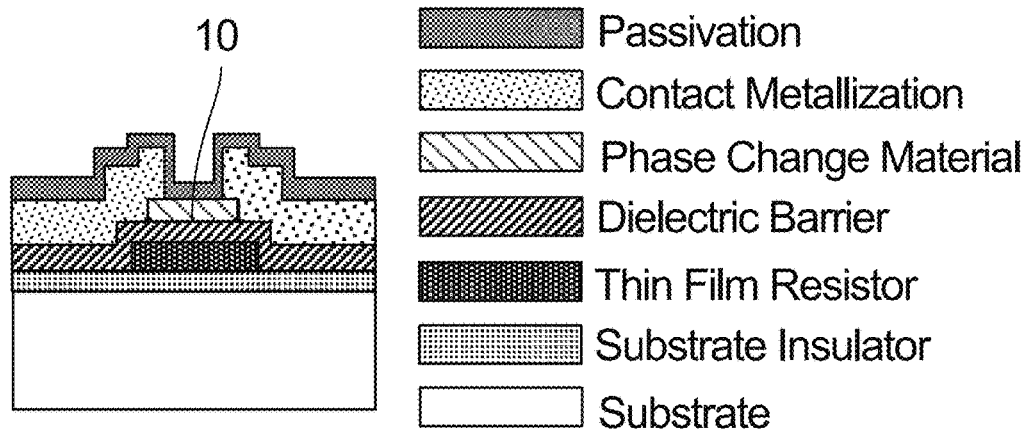
FIGS. 2A, 2B and 2C show prior art PCM-based RF devices each with a single-layer PCM in accordance with the prior art.
Figure 2B:
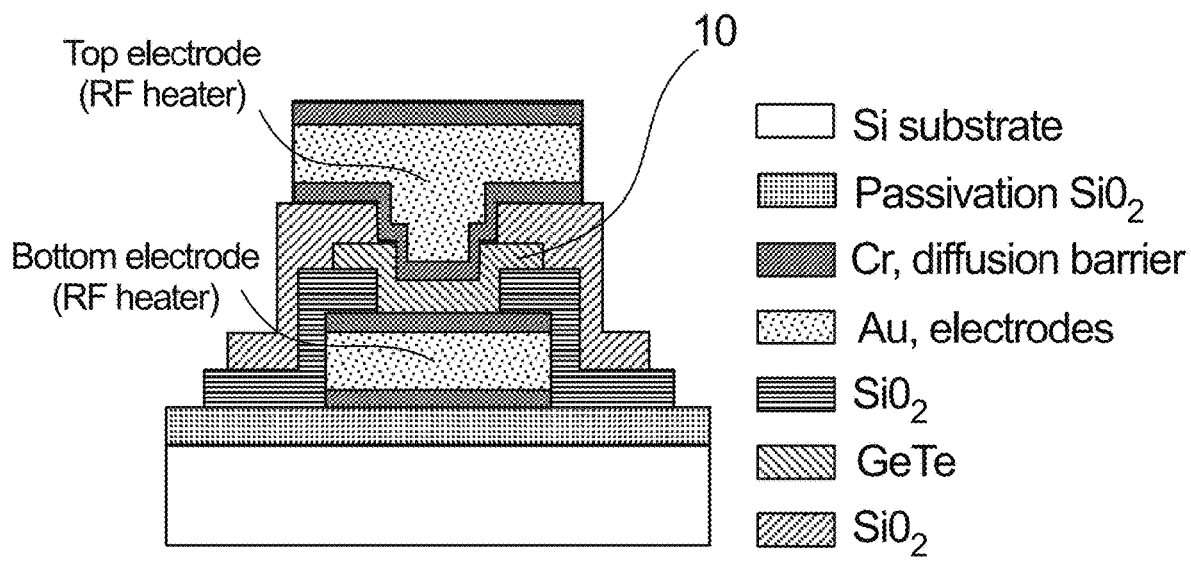
Figure 2C:
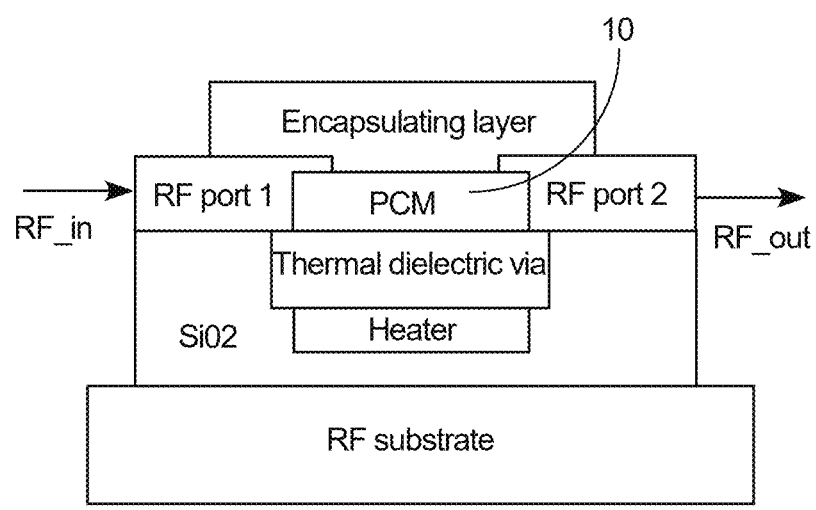

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

The present disclosure describes electrically-reconfigurable devices having multi-layer composite phase change materials (PCMs), rather than prior art devices with a single layer of PCM. PCM devices are actuated by an electrothermal method, which involves the rapid melt-and-quench cycles to change the PCM phase from crystalline to amorphous phase and back. The rapid melt-and-quench cycles induce a volume change and mechanical stress in the PCM, which is known to be a dominant failure mechanism. The present invention discloses devices with a multi-layer composite PCM, which reduces mechanical stress and substantially extends the switching cycle endurance beyond the endurance of single-layer PCM devices. Specifically, the multi-layer composite PCM channel may have multiple repetitions of a SbTe/GeInSbTe composite channel. The multi-layer composite PCM of the present invention can be used in electrical and optical devices that utilize a PCM as a reconfigurable material. It is to be noted that, although the present description discloses the use of SbTe and GeInSbTe layers, other embodiments of the claimed invention can replace SbTe and GeInSbTn in the present description with any appropriate PCM material instead of SbTe and with any appropriate metallic doping of said PCM material instead of GeInSbTe (for example GeSbTe or InSbTe in case the PCM material is still SbTe).

FIG. 3A shows a schematic of an example PCM device structure of the present disclosure with a multi-layer composite phase-change material 20 in accordance with the present disclosure.

FIG. 3B shows a detailed elevation view of the multi-layer composite phase-change material 20. The multi-layer composite phase-change material 20 has a top GeInSbTe (GIST) (germanium indium antimony tellurium) layer 22 to promote a low resistance ohmic contact, and a bottom GeInSbTe layer 24 for improved adhesion to a thermal dielectric layer. In between the top GeInSbTe layer 22 and the bottom GeInSbTe layer 24 is a two layer composite PCM layer 26 that may repeat n times, where n may typically be in the range of 1 to 10. The two layer composite PCM layer 26 includes a SbTe (antimony tellurium) layer 28, which may be 5-15 nm thick, on a GeInSbTe layer 30, which also may be 5-15 nm thick. So, for example, a two layer composite PCM layer 26 that repeats n=4 times has layers SbTe, GeInSbTe, SbTe, GeInSbTe, SbTe, GeInSbTe, SbTe, GeInSbTe, which may be deposited by sputtering at room temperature in the amorphous phase.

FIG. 3C shows a schematic of another embodiment of the present disclosure with a multi-layer composite phase-change material 60. FIG. 3D shows a detailed elevation view of the multi-layer composite phase-change material 60. In the embodiment of FIGS. 3C and 3D, the multi-layer composite phase-change material 60 has a top GeInSbTe layer 22 to promote a low resistance ohmic contact taking advantage of low-electrical resistance of the crystalline-phase, and a bottom GeInSbTe layer with low mechanical stress 24 for improved adhesion to a thermal dielectric layer. A SbTe layer 28 is between the top GeInSbTe layer 22 and the bottom GeInSbTe layer 24 to complete the multi-layer composite phase-change material 60. Therefore the embodiment of FIGS. 3C and 3D is an embodiment of the multi-layer composite phase-change material of FIG. 3B where n=1, and where the GeInSbTe layer 30 is merged or combined with the GeInSbTe layer 24 to form a bottom GeInSbTe layer 24.

The multi-layer composite phase-change materials 20 and 60 may be used in many configurations and for many devices including electrical, RF, optical, switching and memory devices. Generally any device that uses phase-change materials may use the multi-layer composite phase-change material of the present invention to improve cycling endurance. FIGS. 3A and 3C represent just example devices and configurations, but other devices and configurations that use the multi-layer composite phase-change materials 20 and 60 are also possible, and the invention of the present disclosure is not limited by the devices and configurations shown in FIGS. 3A and 3C.

As shown in FIGS. 3A and 3C, a thermal dielectric layer 40 is optionally located between an embedded heater 42 and the multi-layer composite phase-change material 20 (or 60). The thermal dielectric layer may be SiNx, AlN, diamond, or SiC. The heater 42 may include a titanium tungsten (TiW) heater element.

The thermal dielectric layer 40 and the embedded heater 42 may have an length extent that is less than the length extent of the multi-layer composite phase-change material 20 or 60, as shown in FIGS. 3A and 3C, respectively. A dielectric 48, which may be $SiO_2$, may be deposited on the sides of the thermal dielectric layer 40 and the embedded heater 42 so that the multi-layer composite phase-change materials 20 and 60 may be formed to be substantially planar above the thermal dielectric layer 40. The multi-layer composite phase-change materials 20 and 60 may also have shapes different than planar, as may be needed by any particular application.

The embedded heater 42 may be directly on substrate 44, which may be made of materials suitable for radio frequency (RF). Suitable materials for the substrate 44 include high-resistance Si, sapphire, borofloat, quartz, and fused silica.

In another embodiment, a non-thermal dielectric layer 46 may be between the embedded heater 42 and the substrate 44. The non-thermal dielectric layer 46 may be $SiO_2$.

A first ohmic contact 50 is in contact with a first end of the multi-layer composite phase-change materials 20 and 60, and a second ohmic contact 52 is in contact with a second end of the multi-layer composite phase-change materials 20 and 60.

An encapsulating layer 54 may be deposited to partially cover the first ohmic contact 50 and the second ohmic contact 52, and to cover the top of the multi-layer composite phase-change material 20 and 60 between the first ohmic contact 50 and the second ohmic contact 52.

Figure 4A:
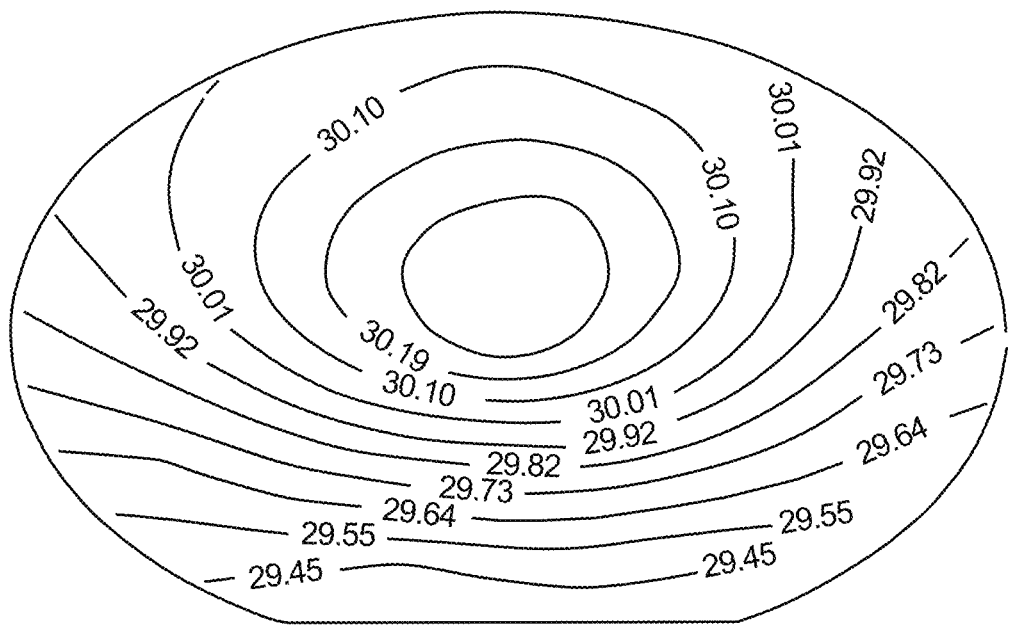
FIG. 4A shows the sheet resistance of a multi-layer composite PCM layer.
Figure 4B:
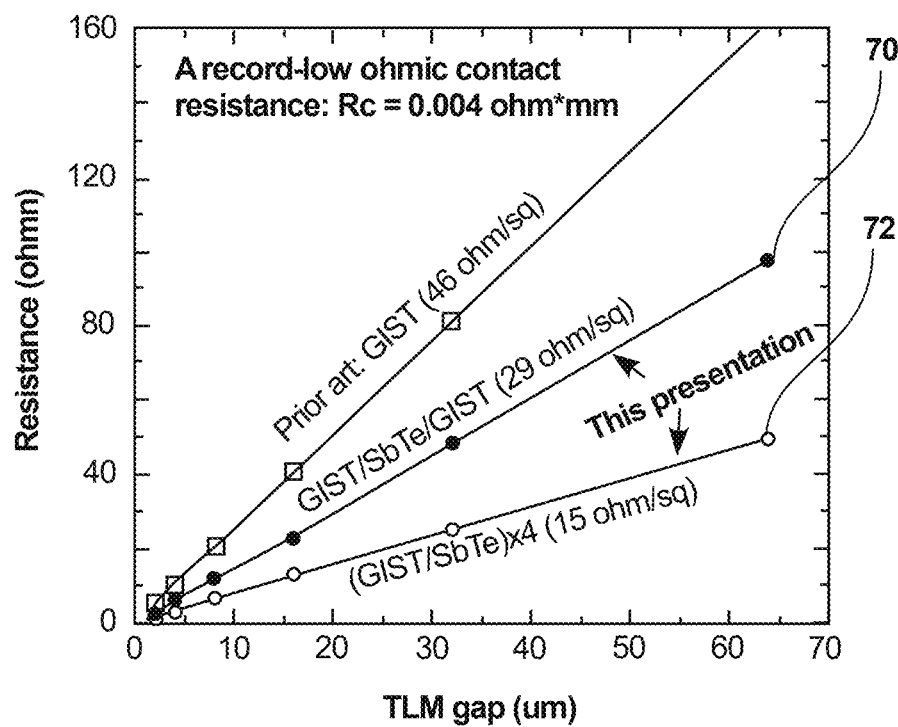
FIG. 4B shows the ohmic contact resistance of a multi-layer composite PCM layer in accordance with the present disclosure.

FIG. 4A shows the sheet resistance of a multi-layer composite PCM layer having the following composition: a top layer of 100A thick GeInSbTe (GIST), 4 composite layers of 100A thick SbTe and 100A thick GIST, and a bottom layer of 100A thick GIST. Each layer can also be designed with a 50-150 A thickness, which is equivalent to 5-15 nm. FIG. 4B shows the resistance of a single GIST and multilayer composite PCMs measured using transmission line measurement (TLM), where the TLM contact gap is 2 um, 4 um, 8 um, 16 um, 31 um, and 64 um. The multilayer composite PCMs, as shown by curves 70 and 72, achieve desirable lower resistances of 29 ohm/sq and 15 ohm/sq in the crystalline phase, compared to the prior art single layer PCM that has a 46 ohm/sq resistance. In the amorphous phase, the sheet resistance is on the order of 30 kohm/sq. In addition, a record low ohmic contact resistance of 0.004 ohm*mm has been demonstrated.

Figure 5B:
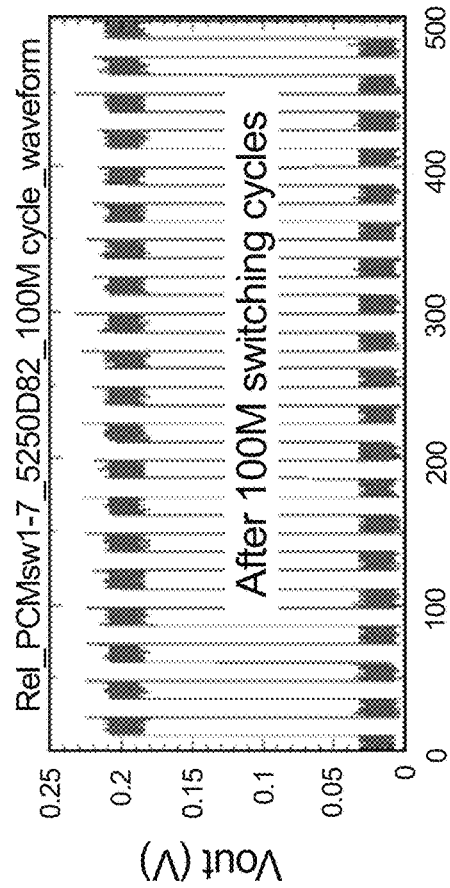
FIGS. 5A, 5B, 5C, 5D and 5E show switching waveforms for PCM switches with a multi-layer composite PCM layer showing the switching cycle reliability in accordance with the present disclosure.
Figure 5D:
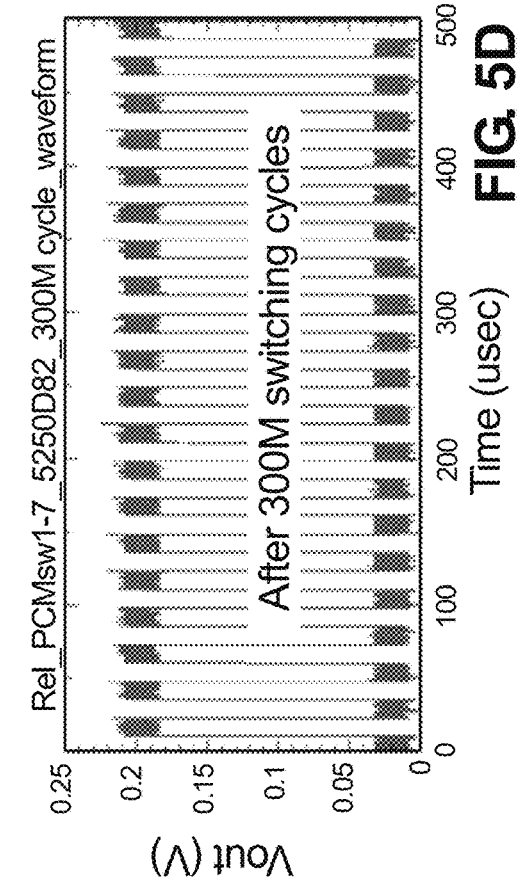
Figure 5A:
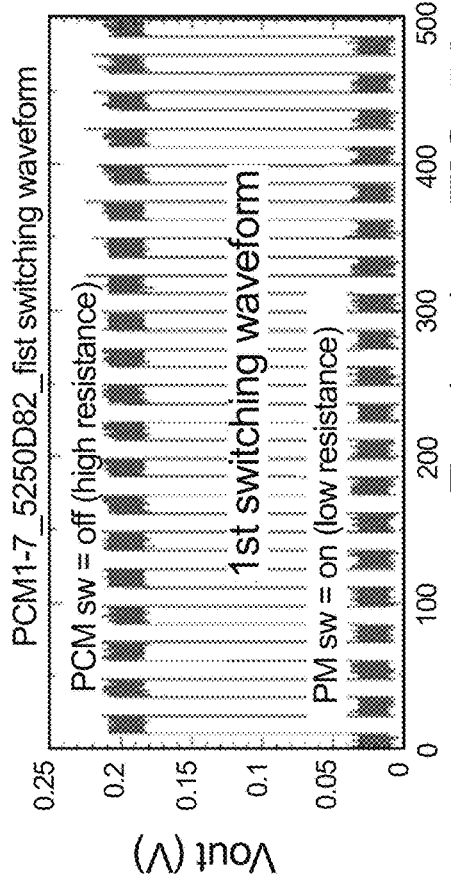
Figure 5C:
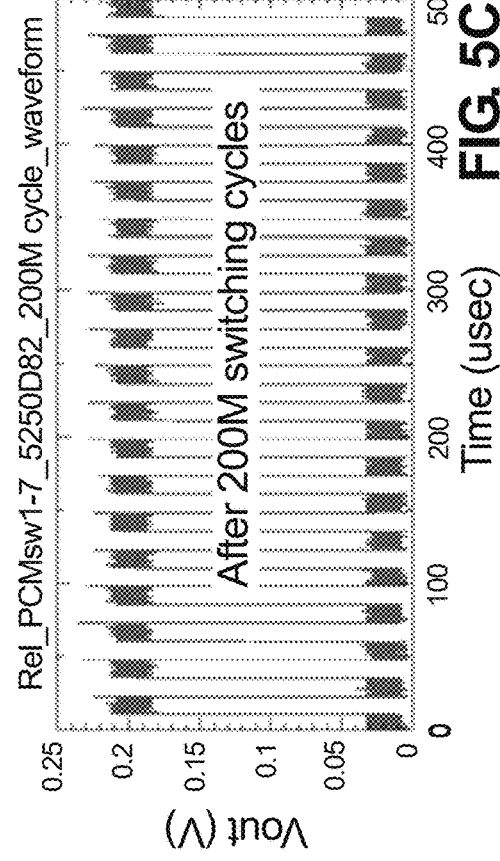
Figure 5E:
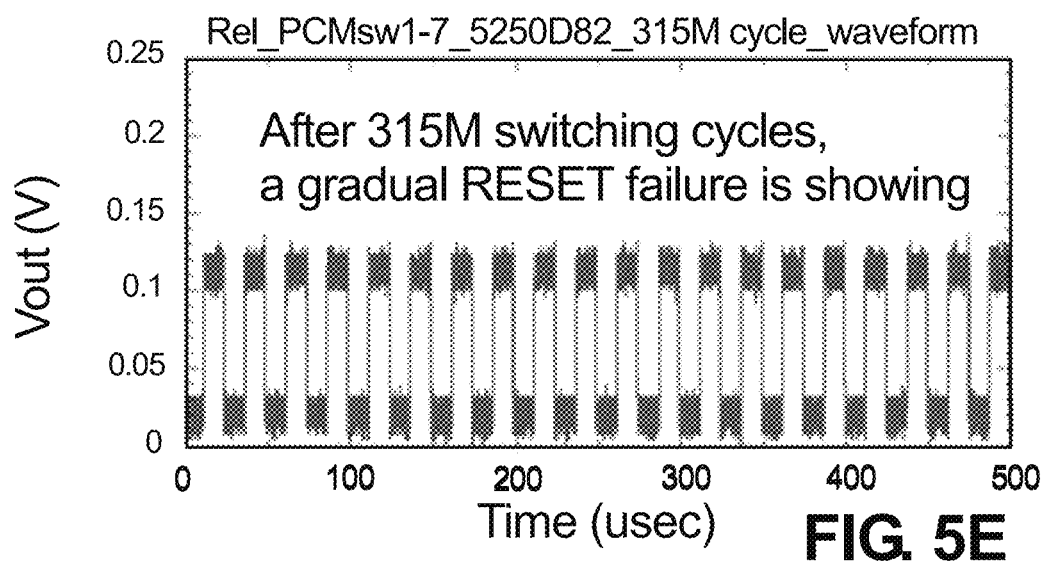

FIGS. 5A-5E show demonstrated switching waveforms for PCM switches with a multi-layer composite PCM layer. The PCM device in this example has a switching area 24 um wide×1 um long. FIG. 5A shows switching waveforms at first switching of the PCM switches, FIG. 5B shows switching waveforms of the PCM switches after 100 million (M) cycles, FIG. 5C shows switching waveforms of the PCM switches after 200 M cycles, FIG. 5D shows switching waveforms of the PCM switches after 300 M cycles, and FIG. 5E shows switching waveforms of the PCM switches after 315 M cycles.

The PCM switches with a multi-layer composite PCM layer have a switching cycle reliability up to 300 million cycles compared to prior art PCM switch devices that have a switching cycle reliability of only about 100 million cycles. FIG. 5D shows that the multilayer PCM devices provide the full electrical switching from the SET output voltage of 0.02 V to the RESET output voltage of 0.2 V up to 300 M cycles without any SET and RESET failures. As shown in FIG. 5E, the PCM switches with a multi-layer composite PCM layer show a reduction in the RESET voltage from 0.2 V to 0.12 V, illustrating the beginning of RESET failure. The RESET failure is gradual after 300 M cycles, and the gradual RESET failure is attributed to the partial delamination of the PCM materials from the heater electrodes after 300 M cycles.

Figure 6A:
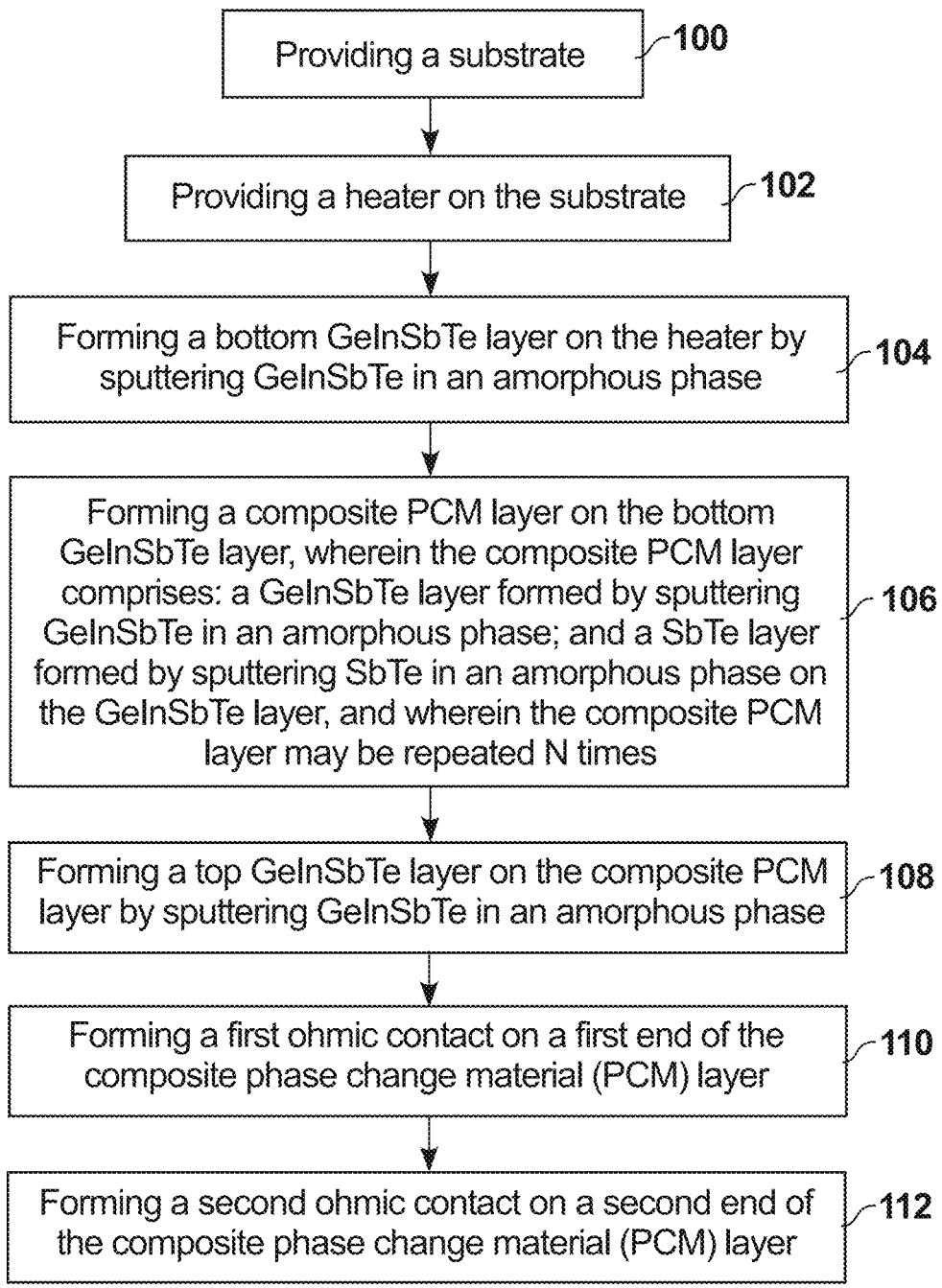
FIGS. 6A and 6B are flow charts of methods for providing PCM switches with a multi-layer composite PCM layer in accordance with the present disclosure.
Figure 6B:
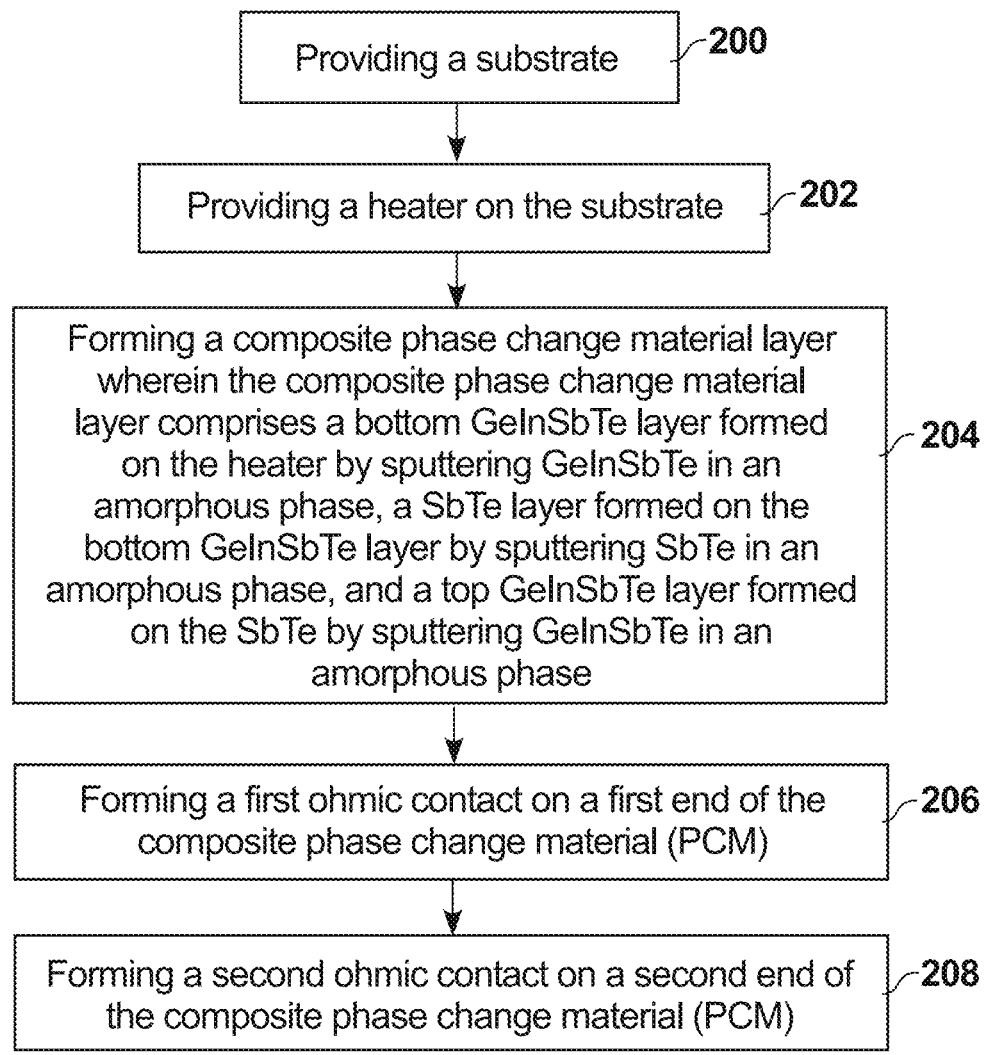

FIGS. 6A and 6B are flows chart of methods for providing PCM switches with a multi-layer composite PCM layer in accordance with the present disclosure.

The steps 100 to 112 shown in FIG. 6A may be followed to fabricate the PCM switches shown in FIGS. 3A and 3B and described above. In step 100 a substrate 44 is provided, then a heater 42 is provided on the substrate in step 102. Then in steps 104, 106 and 108 a multilayer composite PCM 20 is formed. In step 104 a bottom GeInSbTe layer 24 is formed on the heater 42 by sputtering GeInSbTe in an amorphous phase. Next in step 106, a composite PCM layer 26 is formed on the bottom GeInSbTe layer 24, wherein the composite PCM layer 26 comprises: a GeInSbTe layer 30 formed by sputtering GeInSbTe in an amorphous phase on the bottom GeInSbTe layer 24; and a SbTe layer 28 formed by sputtering SbTe in an amorphous phase on the GeInSbTe layer 30. As shown in FIG. 3B and described above the composite PCM layer 26 may be repeated n times. Then in step 108 a top GeInSbTe layer 22 is formed on the composite PCM layer 26 by sputtering GeInSbTe in an amorphous phase on the most top SbTe layer 28 of the repeated composite PCM layers 26. Next in step 110 a first ohmic contact 50 on a first end of the multilayer composite PCM 20 and in step 112 a second ohmic contact 52 is formed on a second end of the multilayer composite PCM 20. As shown in FIG. 3A, the first ohmic contact 50 contacts the side of the first end of the multilayer composite PCM 20 and partially overlaps the top of the multilayer composite PCM 20, and the second ohmic contact 52 contacts the side of the second end of the multilayer composite PCM 20 and partially overlaps the top of the multilayer composite PCM 20.

The steps 200 to 208 shown in FIG. 6B may be followed to fabricate the PCM switches shown in FIGS. 3C and 3D and described above. In step 200, a substrate 44 is provided and in step 202 a heater 42 is provided on the substrate 44. Next in step 204 a composite phase change material layer 60 is formed on the heater 42 wherein the composite phase change material layer 60 comprises a bottom GeInSbTe layer 24 formed on the heater 42 by sputtering GeInSbTe in an amorphous phase, a SbTe layer 28 formed on the bottom GeInSbTe layer 24 by sputtering SbTe in an amorphous phase, and a top GeInSbTe layer 22 formed on the SbTe layer 28 by sputtering GeInSbTe in an amorphous phase. Then in step 206, a first ohmic contact 50 is formed on a first end of the composite phase change material (PCM) 60, and in step 208 a second ohmic contact 52 is formed on a second end of the composite phase change material (PCM) 60. As shown in FIG. 3C, the first ohmic contact 50 contacts the side of the first end of the composite PCM 60 and partially overlaps the top of the composite PCM 60, and the second ohmic contact 52 contacts the side of the second end of the composite PCM 60 and partially overlaps the top of the composite PCM 60.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . "

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A device having:
 a multilayer composite phase change material structure comprising:
  a bottom SbTe PCM layer of a first PCM material having a first metallic doping;
  a first composite PCM layer on the bottom PCM layer, wherein the first composite PCM layer comprises at least:
   a first composite layer, comprising said first PCM material having a second metallic doping; and a second composite layer, comprising said first SbTe PCM material undoped, on the first composite layer; and a top PCM layer, comprising first SbTe PCM material having said first metallic doping, on the composite PCM layer.

2. The device of claim 1, wherein said first PCM material comprises SbTe and wherein said first and second metallic dopings comprise each one of Ge, In, and GeIn.

3. The device of claim 2 wherein:
the bottom PCM layer is a GeInSbTe layer that is 5-15 nm thick;
the top PCM layer is a GeInSbTe layer that is 5-15 nm thick;
the second composite layer is a SbTe layer that is 5-15 nm thick; and
the first composite layer is a GeInSbTe layer that is 5-15 nm thick.

4. The device of claim 1 wherein the first composite PCM layer comprises a superposition of n pairs comprising each said second composite layer on top of said first composite layer with metal-doped SbTe PCM and undoped SbTe PCM, wherein n is greater than one.

5. The device of claim 1 further comprising:
a first ohmic contact on a first end of the multilayer composite phase change material structure;
a second ohmic contact on a second end of the multilayer composite phase change material structure;
a substrate; and
a heater on the substrate and coupled to the multilayer composite phase change material structure.

6. The device of claim 5 wherein the heater comprises TiW.

7. The device of claim 5 further comprising:
a thermal dielectric layer between the heater and the multilayer composite phase change material (PCM);
wherein the thermal dielectric layer comprises SiNx, AlN, diamond, or SiC.

8. The device of claim 5 further comprising:
a thermal barrier coupled between the heater and the substrate;
wherein the thermal barrier comprises $SiO_2$.

9. The device of claim 5:
having a dielectric on the substrate and surrounding the heater; and
wherein the dielectric is configured so that the multilayer composite phase change material structure is planar.

10. The device of claim 5 wherein the substrate comprises:
high-resistance Si, sapphire, borofloat, quartz, or fused silica.

11. The device of claim 5 further comprising:
an encapsulating layer partially covering the first ohmic contact and the second ohmic contact, and covering a top of the top PCM layer between the first ohmic contact and the second ohmic contact;
wherein the encapsulating layer comprises SiNx.

12. A method of providing a phase change material structure, the method comprising:
forming a bottom PCM layer by sputtering a first SbTe PCM material having a first metallic doping in an amorphous phase;
forming a composite phase change material layer on the bottom PCM layer, wherein the first composite phase change material layer comprises at least:
a first composite layer, formed by sputtering said first PCM material having a second metallic doping in an amorphous phase; and
a second composite layer, formed by sputtering said first SbTe PCM material, undoped, in an amorphous phase on the first composite layer; and
forming a top SbTe PCM layer layer on the composite PCM layer by sputtering said first PCM material having said first metallic dopingin an amorphous phase.

13. The method of claim 12, wherein said first PCM material comprises SbTe and wherein said first and second metallic dopings comprise each one of Ge, In, and GeIn.

14. The method of claim 13, further comprising:
forming a first ohmic contact on a first end of the multilayer composite phase change material structure; and
forming a second ohmic contact on a second end of the multilayer composite phase change material structure
providing a substrate; and
providing a heater on the substrate, wherein the heater is coupled to the multilayer composite phase change material sructure.

15. The method of claim 12, wherein the first composite PCM layer comprises a superposition of n pairs of SbTe-based doped and undoped PCM comprising each said second composite layer on top of said first composite layer, wherein n is greater than one.

* * * * *